March 27, 1973 L. G. WISE 3,723,274
METHOD OF ELECTROCOATING USING A FLOWING MERCURY CATHODE
Filed Oct. 30, 1970

INVENTOR
LOWELL G. WISE
BY McNenny, Farrington, Pearne & Gordon
ATTORNEYS

United States Patent Office 3,723,274
Patented Mar. 27, 1973

3,723,274
METHOD OF ELECTROCOATING USING A
FLOWING MERCURY CATHODE
Lowell G. Wise, Cleveland, Ohio, assignor to The
Sherwin-Williams Company, Cleveland, Ohio
Filed Oct. 30, 1970, Ser. No. 88,038
Int. Cl. B01k 5/02; C23b 13/00
U.S. Cl. 204—181                                    7 Claims

ABSTRACT OF THE DISCLOSURE

Process and apparatus for anodically electrodepositing a resin film from an aqueous bath of a water-dispersible polycarboxylic acid resin with an alkali metal hydroxide dispersal agent using a flowable liquid mercury cathode. Alkali metal ions are removed from the aqueous coating bath by cathodic deposition, while the resin is deposited on a metal anode. Mercury and alkali metal values from the amalgam are recovered for reuse.

BACKGROUND OF THE INVENTION

Electrodeposition of continuous films of organic polymeric resinous materials, in thicknesses in the range from about 0.2 to about 1.5 mils from aqueous dispersions of the organic polymer, is fast becoming a most profitable high-volume industrial coating operation. The advantages and economies which redound to this electrocoating process are well-documented in the prior art. The instant invention is specifically directed to a particular disadvantage which will be discussed hereinbelow in further detail.

Presently commercialized electrocoating processes utilize aqueous solutions or dispersions of polycarboxylic acid resins which are induced to migrate by direct electric current toward a surface to be coated which forms the anode. Usually a plurality of articles are dipped serially in a bath in which one or more cathodes are immersed in close proximity to said anodically biased articles. Continuous or semi-continuous coating systems can be provided in which the articles remain in the bath for a predetermined period of time, during which the electrocoating process conditions are adjusted in such a manner as to deposit a continuous, even and densely coated film. By continuous coating is meant a process which is carried out essentially as a steady state process, but might also include intermittent or semi-batch operations in which the mass flow rates of materials to the tank as well as process conditions are adjusted so that the coating solution in the tank maintains a composition within well-defined limits under predetermined operating conditions. The rate of removal of dispersal agent is determined by the extent to which the polycarboxylic acid resin is neutralized and the degree of solubilization of the makeup feed material, the object being to avoid an undue accumulation of alkali metal ions in the electrocoating bath.

During such a continuous electrocoating process, the polymeric resinous component of the bath is depleted while the solubilizer or dispersal agent which is used to neutralize the polycarboxylic acid resin remains and becomes progressively more concentrated in the bath, causing an undesirable rise in pH, which if permitted to increase beyond the limits of bath stability, causes uneven and defective paint coatings to be deposited. One method of delimiting the pH level in the bath is to add partially solubilized makeup material to the bath relying upon the excess solubilizer to solubilize the makeup paint. However, to be effective, the makeup paint must be added very slowly and often does not avoid lumping of the paint in the bath. An alternate method for coping with progressive concentration of solubilizer ions is to remove them as they are formed. For example, when the dispersal agent is volatile, such as ammonia or volatile amines, the removal of the agent is as simple as it is noxious—it evaporates from the surface of the bath. Where the dispersal agent is non-volatile, separation is effected by processes described in U.S. Pats. Nos. 3,304,250; 3,419,488; or 3,448,017.

SUMMARY OF THE INVENTION

It has been discovered that anodic electrodeposition of a synthetic resin from an aqueous bath containing alkali metal solubilizer ions may be effected continuously by electrolytically removing alkali metal ions at a rate substantially the same as the rate at which alkali metal ions are introduced in the makeup feed stream. Taking advantage of the ease with which alkali metals form mercury amalgams, removal of alkali metal ions is effected by contacting the aqueous bath with liquid mercury during the electrocoating process, the liquid mercury acting as the cathode towards which the alkali metal ions migrate and in which they are assimilated to form an amalgam. Liquid mercury is flowed through the cell at a rate sufficient to remove the excess alkali metal ions without permitting the concentration of said ions in the mercury to render the amalgam non-fluid.

The amalgam is flowed out of the electrodeposition cell and treated for recovery of the alkali metal. The mercury is then recirculated to the electrodeposition cell.

THE DRAWINGS

Figure 1:
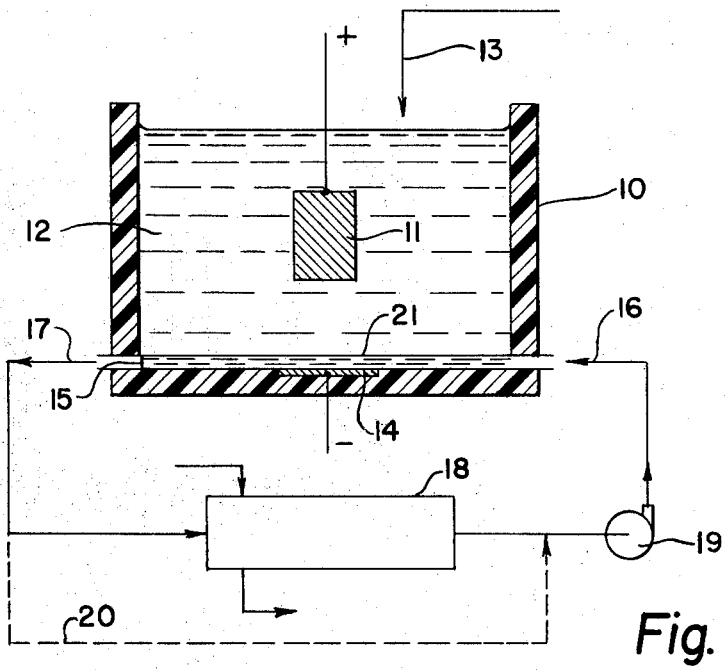
FIG. 1 is a schematic representation of an electrocoating bath in which a recirculating liquid mercury cathode is flowed across the bottom of the bath and regenerated by recovery of alkali metal prior to recirculation of the mercury to the electrodeposition bath.

PREFERRED EMBODIMENT OF THE
INSTANT INVENTION

The electrodeposition of polycarboxylic acid resins from aqueous solutions is generally accomplished with the help of water soluble amines, alkali metal hydroxides and ammonia. Ammonia and the amines may be driven from the bath by vaporization but the alkali metal hydroxides which include lithium, potassium and sodium hydroxides, do not evaporate. The inventory of solubilizer in the electrocoating bath at any time is a function of the initial amount present at start-up, plus the amount added in makeup feed material, less the amount removed from the tank by anodic co-deposition, and drag-out. On occasion it might be desirable to use a mixture of volatile and fixed dispersant materials but it is preferred that the major equivalent portion of dispersant base consist essentially of at least one fixed hydroxide of an alkali metal of atomic number between 3 and 19 (lithium, potassium or sodium). For most polycarboxylic resins used in electrocoating, about 0.3–1 equivalent of base per free carboxyl group is required to effect solubilization or dispersion of the resin in water. Under the conditions of electrocoating, the neutralized resin dissociates into an electronegative macromolecular portion, which is anodically deposited, and an electropositive free base portion, which migrates to the cathode. A minor amount of base may be removed from the bath by drag-out in a layer adhering to the electrocoated anode. For a typical electrocoating bath having 10–15% solids, up to 20 weight percent of the dispersant base may be removed by anodic co-deposition and/or drag-out.

Since the amount of solubilizer required to solubilize the makeup feed material is substantially greater than the amount of solubilizer lost by anodic co-deposition and/ or drag-out, the excess must be removed by the flowable liquid mercury cathode. It has been observed by workers in the electrocoating field that the relationship between the electrophoretic deposition of polycarboxylic resin films and the amount of current consumed in the process, is approximately proportional. A nearly stoichiometric relationship between the weight of resin deposited and the number of coulombs passed, has been found for the anodic process. Although this relationship does not equal the electrochemical precision with which various electrolytic processes follow Faraday's Law, a close relationship exists between the amount of polycarboxylic acid resin deposited at the anode and the number of cations discharged at the cathode.

The use of a flowable liquid mercury cathode in the electrolytic reduction of aqueous solutions containing alkali metal cations is well known. Where a mercury cathode is used, the over-voltage of hydrogen (over mercury) is higher than the over-voltage of alkali metal ions (over mercury), which causes the alkali metal ions to be discharged preferentially, if the voltage is critically controlled so as not to exceed the deposition voltage of hydrogen. Thus, in the production of chlorine in commercial De Nora mercury cells, a critically controlled voltage along with a critically controlled voltage gradient permits the high-volume production of hydrogen-free chlorine.

In the instant invention, under certain conditions, it may be desirable to evolve a substantial quantity of hydrogen. This is particularly surprising in view of the fact that "cathodic hydrogen evolution is known to have deleterious effects on the anode deposits where the hydrogen gas bubbles become dispersed in the electrocoating bath and are deposited at the anode, causing 'pin holing'" (J. Paint Technology 38, No. 499, p. 425). In other instances, for example in the coating of a continuous strip of steel, described hereinbelow, substantially no hydrogen may be desired. In general, hydrogen gas evolution is accelerated with increasing current at higher voltages, the increased current density causing depletion of alkali metal ions in the vicinity of the cathode surface. For greater speed of anodic deposition, a relatively high voltage gradient is desirable. When a relatively low operating voltage is desired, a high voltage gradient may be obtained by spacing the anode surface very close to that of the liquid mercury layer. Where this is impractical, and it is still desired to maintain a relatively high average voltage, this may be effected by alternating high and low voltages with a square wave type direct current. Where such a square wave type direct current is employed, a higher voltage could be intermittenly imposed on or alternated with a lower voltage of the same polarity, the relative duration of each potention level controlling the relative amounts of hydrogen and alkali metal ions discharged.

Referring specifically to a preferred embodiment depicted in FIG. 1, an electrocoating tank 10 is made from an appropriate electrically insulating material, or from a conductive metal which is adequately insulated by a rubber liner or other electrically insulating sheeting. The anode 11 is suspended in the aqueous dispersion of solubilized synthetic resinous material 12 which is intermittently replenished with makeup feed introduced at any convenient location 13. Liquid mercury 21 is flowed across the bottom of the bath in electrical contact with a conductor 14, the mercury layer 21 being in fluid contact with the aqueous dispersion. The thickness of the mercury layer 21 is adjustable by means of an over-flow weir 15 or by the rate at which mercury is pumped into the electrocoating bath at mercury inlet 16. An inclined plane may be used having a slight elevation drop across the cell. Amalgam flows out at 17 and into a recovery means 18. Alkali metal is separated from the mercury which is recirculated by pump 19 to the electrocoating tank 10. A bypass 20 around the recovery means 18 is provided to adjust the level of flexibility in the recirculation system.

Figure 2:
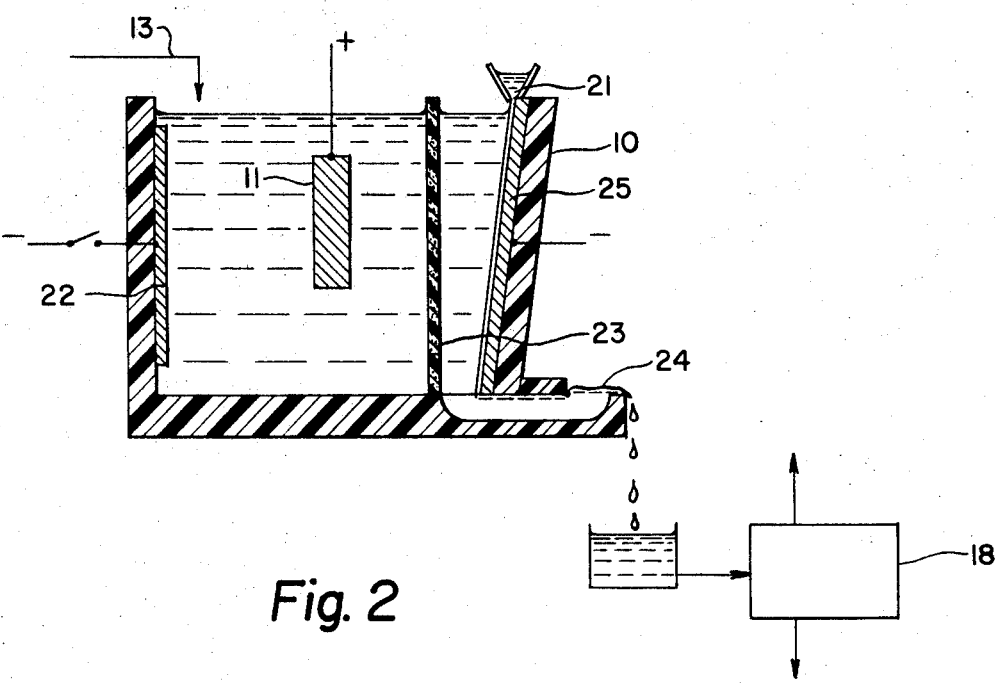
FIG. 2 shows another embodiment of an electrodeposition cell in which a porous membrane is used to separate the anode from a substantially vertical-flowing layer of liquid mercury from which alkali metal may be recovered prior to recirculation of the mercury, as in the previous embodiment.

In FIG. 2 which represents another embodiment of the instant invention, the electrocoating bath 10 is equipped with an auxiliary cathode 22 and a permeable, optionally permselective, membrane 23 which is interposed between said auxiliary cathode 22 and a substantially vertically flowing curtain of liquid mercury 21 which is in fluid contact with the bath. Amalgam flows out near the bottom 24 of the electrocoating tank 10 into a recovery means 18 for separation of the alkali metal prior to recirculation of the mercury, as described hereinbefore. Hydrogen may be liberated at the auxiliary cathode if desired. Makeup material may be added at 13. Catholyte 25 in contact with the falling curtain 21 is essentially paint-free.

Figure 3:
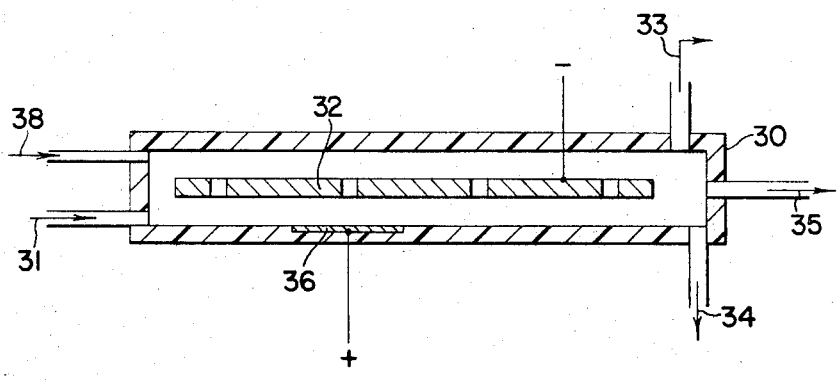
FIG. 3 is a schematic view of a typical regeneration system for the recovery of alkali metal from the amalgam.

In FIG. 3, which is a schematic representation of a recovery means for the purification of amalgam by an electrochemical oxidation process, the body of the cell 30 is formed from a suitable, electrically non-conductive material, or a conductive material suitably sheathed with a non-conductive material. Water is flowed onto the surface of the amalgam placing the cathode 32 in electrical contact with the amalgam, which is introduced at 31 and forms a layer on the floor of the cell in contact with the anode 36. The alkali metal loses an electron and enters the aqueous phase as a cation. The rate of flow of water through an inlet 38 is adjusted so as to eprmit a concentrated alkali metal hydroxide solution to be withdrawn from the cell at 35. Hydrogen gas evolved is removed at 33 and substantially pure mercury is recovered at 34. The denuder cell operates as a fuel cell and power generated by it may be superimposed upon the electrodeposition bath.

Other methods for recovery of substantially pure mercury from the amalgam include distillation, described in U.S. Pat. No. 2,833,644, and decomposition of the amalgam by contacting it with an aqueous phase using a conductor to short-circuit the materials and dissipate heat.

In operation, the process is conducted as follows: a polycarboxylic acid resin is solubilized and flowed into an electrocoating tank 10 in which at least one, and more usually a plurality of anodes 11, are dipped sequentially. Liquid mercury is pumped through the inlet 16 and flowed across the bottom of the electrocoating tank so as to maintain a layer of liquid mercury from less than a millimeter up to several centimeters. The rate of flow of mercury is controlled so as to prevent the alkali metal content of the amalgam from exceeding a level which reduces fluidity of the amalgam. This may be accomplished by monitoring the alkali metal content of the effluent amalgam, the alkali concentration in the electrocoating bath, or by adjusting the electrocoating current, or by any desired combination of the foregoing methods. The solubilized polycarboxylic acid resin is slowly flowed over the mercury layer until the level in the tank is deep enough to submerge the anodes. During electrodeposition, the polycarboxylic acid resin is electrodeposited onto the anodes. After the bath has been operated for some time, it will be necessary to add to the bath a makeup feed 13 so as to replenish the amount of resin which has been anodically electrodeposited. The coating solution is preferably solubilized with an alkali metal hydroxide, such as lithium hydroxide. The makeup feed material is essentially fully solubilized, as during operation, essentially no excess solubilizer ions are available in the bath for solubilization of incompletely solubilized feed material. This is due to the fact that alkali metal solubilizer ions migrate to the liquid mercury cathode and are discharged, forming amalgam which flows out of the cell at 17 and is then led to a recovery means 18 which is essentially a decomposition cell in which a titanium or carbon electrode is centrally disposed as a cathode. Amalgam flowing into the cell is in contact with the cathode; water is introduced into the cell to form small electrolytic cells which evolve hydrogen and form an alkaline solution with the liberated alkali metal; subtantially pure mercury leaves the cell. The pure mercury is recirculated to the inlet of the electrocoating bath. Other recovery means, such as the fuel cell described hereinabove and in FIG. 3, may also be used.

The use of a flowing mercury layer as a cathode permits the control of alkali metal content of the amalgam at a level lower than about 0.3 percent by weight of the amalgam, at which level the amalgam loses its fluidity. Use of a static liquid mercury layer is disclosed in an abstract published in "Chemical Abstracts," vol. 72, 1970, at page 61.

In the following examples, specific results obtained are recorded.

EXAMPLES 1–3

A weighed panel is disposed in a cell, the bottom of which contains a layer of liquid mercury 5.0 mils thick. A polycarboxylic resin paint containing about 12% NVM and about 35% neutralized with lithium hydroxide is introduced into the cell above the mercury layer. The panel is connected to the positive side of a direct electric current source and the liquid mercury layer is connected to the negative side. Current is passed at various voltages itemized hereinbelow in the table for a period of 60 seconds for each electrodeposition, after which the mercury is drained from the cell into a flask containing 25 ml. of saturated sodium chloride solution. The electrocoated panel is then baked at 400° F. for 20 minutes and weighed. The mercury and sodium chloride solution is allowed to stand for a few minutes to allow the amalgam to reverse itself. Two drops of phenolphthalein indicator are added to the flask, turning the aqueous solution pink. Following this step, a 0.126 N hydrochloric acid solution is added dropwise until the pink discoloration disappears. The flask is then allowed to stand for 15 minutes to see if more lithium would leach out of the amalgam. The steps are repeated until a clear solution is obtained. A small known volume of HCl acid is added and the sample back-titrated with 0.153 N sodium hydroxide solution to determine the number of mols of lithium amalgamated during electrodeposition.

Current flow is recorded during deposition and the area under the current curve is measured with a planimeter to determine the corresponding number of mols of electrons. The ratio of the mols of lithium to mols of electrons is a measure of the efficiency of the electrocoating bath. In the following examples set forth in the table hereinbelow, 3 panels were run at each voltage and the averages computed. The pH drop of the bath after all the panels were coated was negligible.

The polycarboxylic resin paint used above may also be used in admixture with suitable polymers, such as those obtained from styrene, butadiene, and the like.

I claim:

1. In a method of continuously or semi-continuously electrocoating an electrically conductive anode with a synthetic organic resin from an aqueous dispersion of a water dispersible polycarboxylic acid resin neutralized with an alkali metal hydroxide in an electrocoating bath, wherein a direct current is passed between said anode and an electrically conductive metal cathode in electrochemical contact with said aqueous dispersion, the improvement which comprises:
    providing a flowable liquid mercury cathode in electrical contact with said aqueous dispersion, and
    electrolytically reducing alkali metal ions at said liquid mercury cathode to form amalgam.

2. The method of claim 1 wherein the alkali hydroxide consists essentially of at least one hydroxide of an alkali metal having an atomic number from 2 to 19; wherein the aqueous dispersion is maintained in the temperature range from about 0 to about 75° C.; wherein the aqueous dispersion contains between 3 and 15 weight percent polycarboxylic resin and is maintained at a pH from about 7.1 to about 11; and wherein a direct current potential of from about 20 to about 250 volts applied between said anode and said cathode during electrocoating, generates at least some hydrogen.

3. The method of claim 2 wherein the polycarboxylic resin has acid value between from about 30 to about 300; and wherein said aqueous dispersion includes pigment particles.

4. The method of claim 2 wherein said amalgam is continuously or semi-continuously removed from said electrocoating bath and is denuded of its alkali metal content so as to leave substantially pure liquid mercury which is recycled to said bath.

5. The method of claim 1 wherein said anode is substantially parallel to the surface of said liquid mercury cathode and spaced therefrom to provide a gap from about 0.1 mm. to about 10 mm.

6. The method of claim 5 wherein the voltage applied is insufficient to evolve enough hydrogen to result in "pin holing" of the anode surface.

7. A continuous process for anodic electrocoating comprising the step of:
    (a) maintaining an aqueous electrocoating bath containing a water-dispersed synthetic resin material comprising an electronegative macromolecular fraction and electropositive alkali metal ions;
    (b) submerging an electrically conductive article in said bath while biasing an electrically conductive article anodically;
    (c) incorporating alkali metal ions in a flowable mercury cathode;
    (d) electrodepositing said macromolecular fraction on said article;
    (e) replenishing said bath with sufficient solubilized resin to maintain an acceptable net accumulation or depletion of electropositive and electronegative ions in said bath;
    (f) removing flowable alkali metal-mercury amalgam from said bath;
    (g) recovering alkali metal from said amalgam, leaving

TABLE

| | Voltage direct current (volts) | Duration of electro- deposition (seconds) | Lithium amalga- mated (moles $\times 10^{-5}$) | Coating deposited (grams) | Current expended (cou- lombs) | Effective percent |
|---|---|---|---|---|---|---|
| Example number: | | | | | | |
| 1 | 20 | 60 | 0.378 | .0160 | 1.83 | 20 |
| 2 | 50 | 60 | 1.1 | .0693 | 3.074 | 34 |
| 3 | 100 | 60 | 2.4 | .1009 | 5.878 | 39 | substantially pure metallic mercury and recycling said metallic mercury to said bath.

References Cited

UNITED STATES PATENTS

| | | | |
|---|---|---|---|
| 3,308,043 | 3/1967 | Loftfield et al. | 204—124 |
| 2,829,096 | 4/1958 | Clement | 204—124 |

OTHER REFERENCES

Chemical Abstracts, No. 18, vol. 72, May 4, 1970, at 61 (¶ 91514w).

HOWARD S. WILLIAMS, Primary Examiner